US009234533B2

(12) United States Patent
Olson

(10) Patent No.: US 9,234,533 B2
(45) Date of Patent: Jan. 12, 2016

(54) ELECTRO-HYDRAULIC PILOT OPERATED RELIEF VALVE

(71) Applicant: Parker-Hannifin Corporation, Cleveland, OH (US)

(72) Inventor: Matthew Olson, Maple Grove, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 418 days.

(21) Appl. No.: 13/834,627

(22) Filed: Mar. 15, 2013

(65) Prior Publication Data

US 2013/0247750 A1 Sep. 26, 2013

Related U.S. Application Data

(60) Provisional application No. 61/613,293, filed on Mar. 20, 2012.

(51) Int. Cl.

| | |
|---|---|
| ***F16D 31/02*** | (2006.01) |
| ***F15B 13/02*** | (2006.01) |
| ***F15B 13/01*** | (2006.01) |
| ***F15B 7/00*** | (2006.01) |

(52) U.S. Cl.

CPC ............... *F15B 13/024* (2013.01); *F15B 7/006* (2013.01); *F15B 13/015* (2013.01); *F15B 2211/20538* (2013.01); *F15B 2211/20561* (2013.01); *F15B 2211/30515* (2013.01); *F15B 2211/50518* (2013.01); *F15B 2211/7053* (2013.01); *F15B 2211/785* (2013.01); *Y10T 137/86485* (2015.04)

(58) Field of Classification Search

CPC ...... F15B 13/01; F15B 13/015; F15B 13/024; F15B 15/18; F16H 61/4052

USPC ....................................... 60/468, 475; 91/420

See application file for complete search history.

(56) References Cited

U.S. PATENT DOCUMENTS 2,467,508 A * 4/1949 Trautman ........................ 60/475

* cited by examiner

*Primary Examiner* — Michael Leslie

(74) *Attorney, Agent, or Firm* — Renner, Otto, Boisselle & Sklar, LLP

(57) ABSTRACT

Provided is a method of and valve assembly for dumping excess fluid during retraction of a cylinder actuator. The method includes pumping fluid with a pump from a piston side of the cylinder to a rod side of the cylinder; opening a first check valve with relatively high pressure fluid from a downstream side of the pump to allow flow into the rod side of the cylinder; and opening an extend relief valve via a first spool with fluid from the downstream side of the pump to allow excess fluid at an upstream side of the pump to return to a reservoir at relatively low pressure.

18 Claims, 4 Drawing Sheets

ELECTRO-HYDRAULIC PILOT OPERATED RELIEF VALVE

RELATED APPLICATIONS

This application claims the benefit of U.S. Provisional Application No. 61/613,293 filed Mar. 20, 2012, which is hereby incorporated herein by reference.

FIELD OF INVENTION

The present invention relates generally to hydraulic valves, and more particularly to a pilot-operated relief valve.

BACKGROUND

Cylinder actuators are used to actuate loads. The cylinder may impart a force while either extending or retracting which in turn moves the load respectively. This operation can be performed with several different styles of actuators including electro-mechanical, pneumatic, and hydraulic. Various valves control the fluid circuits in hydraulic systems.

An electro-hydraulic actuator (EHA), for example, functions in a bi-rotational design; the direction of the electric motor rotation and thus hydraulic pump flow is determined by the electric polarity applied to the motor leads. Thus when the polarity is applied in the extend direction, the pump will produce flow to the piston side of the cylinder. As the cylinder extends, the fluid from the rod side of the cylinder will return to the pump and flow to the piston side of the cylinder.

Conversely, when electrical polarity is applied in the reverse direction, the pump will reverse rotation and pump flow to the rod side of the cylinder. As such, the piston side fluid returns to the pump to be delivered to the rod side of the cylinder.

As the EHA is designed to exert force in both extend and retract directions, there is consideration made for over pressure valves with, for example, one valve dedicated to each side of the hydraulic circuit (extend and retract respectively). These relief valves are designed to limit the operating pressure to a safe level preventing mechanical damage to the EHA components during operation.

Additional valving is also common to a double-acting hydraulic circuit to compensate for the issue of differential areas between the rod and piston sides of the cylinder. Because the cylinder rod may be present on one side of the cylinder and not the other, there is a difference in hydraulic volume between the piston side and rod side. Therefore as the cylinder extends, the volume of fluid returning from the rod side is insufficient and additional oil must be drawn from tank via a check valve. As the cylinder retracts, excessive fluid returns to the pump and thus needs to be dumped to a reservoir. This can be accomplished via several designs.

Conventional designs will use the retract relief valve to dump this fluid to tank.

Another design utilizes an additional relief valve set to a minimal pressure in combination with a pilot operated check valve to allow the excess fluid to return to tank.

SUMMARY OF INVENTION

Because use of a retract relief valve to dump this excess fluid to tank results in this fluid being dumped at excessively high pressures—thus creating unnecessary heat in the hydraulic fluid and wasting energy—it is not desirable.

Further, a design that utilizes an additional relief valve set to a minimal pressure in combination with a pilot operated check valve to allow the excess fluid to return to tank addresses the issues of heat and energy, it adds cost and complexity by adding additional valves to the hydraulic circuit as well as causes internal leakage issues inherent to the design.

The design of the present application works to address the issues listed above. By pilot operating the extend relief valve, the low pressure return of fluid can still be accomplished without the need to incorporate an additional valve into the hydraulic circuit. Utilizing a spool valve to pilot operate the extend relief valve during the retract function, the larger area of the spool can be used to open the valve as opposed the small area of the valve thereby reducing the pressure necessary to open the valve. This essentially turns a high pressure relief valve during extend into a low pressure return valve during retract.

Therefore, according to one aspect of the invention, a valve assembly for releasing excess fluid to a reservoir at low pressure includes a first spool moveable in a first bore in a valve body having a first side and a second side; a first check valve disposed in the first side of the first bore; an extend relief valve disposed in the second side of the first bore; a second spool moveable in a second bore in the valve body having a first side and a second side; and a second check valve disposed in the second side of the second bore. The first spool is configured to press against and thereby open the first check valve when the first spool is energized by relatively high pressure fluid in the second side of the bore, and is further configured to press against and thereby open the extend relief valve when the first spool is energized by relatively high pressure fluid on the first side, thereby allowing relatively low pressure fluid to flow through the extend relief valve. The second spool is configured to press against and thereby open the second check valve when the second spool is energized by relatively high pressure fluid in the first side of the second spool.

Optionally, the first check valve has a flow side and a block side and is configured to open when relatively high pressure fluid impinges on the flow side.

Optionally, the extend relief valve has a flow side and a block side and is configured to remain closed when relatively high pressure fluid impinges on the flow side.

Optionally, the first spool has a protrusion facing the second side for contacting the extend relief valve and a surface area facing the first side substantially greater than the surface area of the protrusion, thereby granting a mechanical advantage to the system for allowing the relatively high pressure fluid on the first side to actuate the extend relief valve through the first spool.

Optionally, the first side of the first spool is in fluid communication with a flow side of the first check valve.

Optionally, the second side of the first spool is in fluid communication with the flow side of the extend relief valve.

Optionally, the second check valve has a flow side and a block side and is configured to open when relatively high pressure fluid impinges on the flow side of the second check valve.

Optionally, the first side of the first spool is in fluid communication with the first side of the second spool, and the second side of the first spool is in fluid communication with the second side of the second spool.

Optionally, the second side of the second spool is in fluid communication with a flow side of the second check valve.

Optionally, the first side of the first spool is sealed away from the second side of the first spool by an O-ring seal located in an annular groove of the first spool.

According to another aspect of the invention, a valve assembly for releasing excess fluid to a reservoir at low pressure includes a first spool moveable between first, second, and third positions in a first bore in a valve body, the first bore having a first side and a second side; a first check valve disposed in the first side of the first bore; an extend relief valve disposed in the second side of the first bore; a second spool moveable between first, second, and third positions in a second bore in the valve body, the second bore having a first side and a second side; and a second check valve disposed in the second side of the second bore. The first spool presses against and thereby opens the first check valve when the first spool is in the first position, and presses against and thereby opens the extend relief valve when the first spool is in the third position, thereby allowing relatively low pressure fluid to flow through the extend relief valve. The second spool presses against and thereby opens the second check valve when the second spool is in the third position.

Optionally, the first check valve has a flow side and a block side and is configured to open when relatively high pressure fluid impinges on the flow side.

Optionally, the extend relief valve has a flow side and a block side and is configured to remain closed when relatively high pressure fluid impinges on the flow side.

Optionally, the first spool has a protrusion facing the second side for contacting the extend relief valve and a surface area facing the first side substantially greater than the surface area of the protrusion, thereby granting a mechanical advantage to the system for allowing the relatively high pressure fluid on the first side to actuate the extend relief valve through the first spool.

Optionally, the first side of the first spool is in fluid communication with a flow side of the first check valve.

Optionally, the second side of the first spool is in fluid communication with the flow side of the extend relief valve.

Optionally, the second check valve has a flow side and a block side and is configured to open when relatively high pressure fluid impinges on the flow side of the second check valve.

Optionally, the second side of the second spool is in fluid communication with a flow side of the second check valve.

According to another aspect of the invention, a method of dumping excess fluid during retraction of a cylinder actuator includes pumping fluid with a pump from a piston side of the cylinder to a rod side of the cylinder; opening a first check valve with relatively high pressure fluid from a downstream side of the pump to allow flow into the rod side of the cylinder; and opening an extend relief valve via a first spool with fluid from the downstream side of the pump to allow excess fluid at an upstream side of the pump to return to a reservoir at relatively low pressure.

Optionally, the method includes opening a second check valve via a second spool with relatively high pressure fluid from the downstream side of the pump to allow flow from the piston side of the cylinder.

The foregoing and other features of the invention are hereinafter described in greater detail with reference to the accompanying drawings.

DETAILED DESCRIPTION

Figure 1:
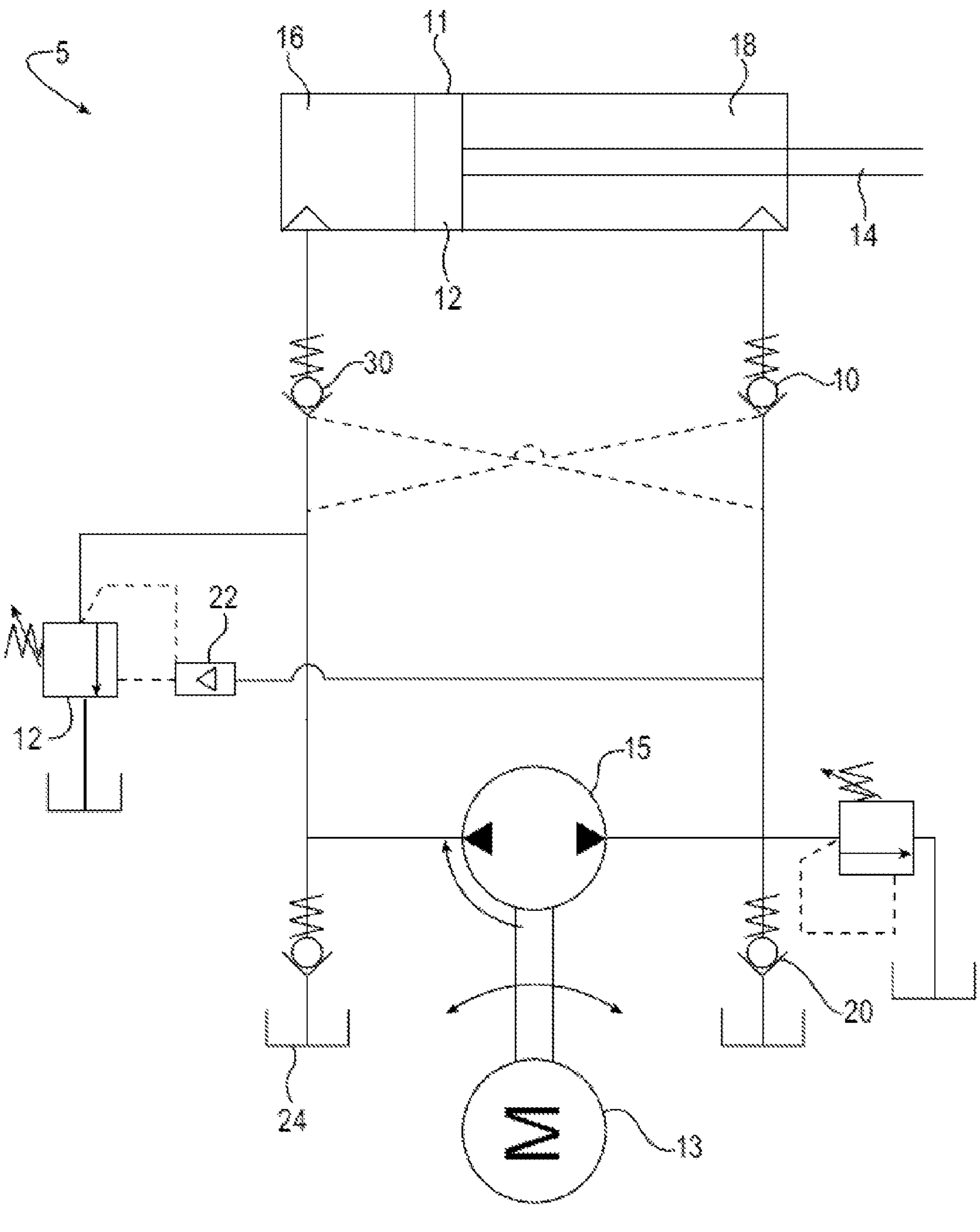
FIG. 1 shows a schematic view of an exemplary cylinder actuator circuit using an extend relief valve as a pilot-operated dump valve.

An exemplary method of dumping excess fluid during retraction of a cylinder 11 actuator includes pumping fluid with a pump 15 from a piston side 16 of the cylinder to a rod side 18 of the cylinder; opening a first check valve with relatively high pressure fluid from a downstream side of the pump 15 to allow flow into the rod side 18 of the cylinder 11; and opening an extend relief valve via a first spool with fluid from the downstream side of the pump to allow excess fluid at an upstream side of the pump 15 to return to a reservoir 24 at relatively low pressure.

The method may further include opening a second check valve via a second spool with relatively high pressure fluid from the downstream side of the pump to allow flow from the piston side of the cylinder.

Referring initially to FIG. 1, shown is an exemplary cylinder actuator circuit 5 including a cylinder 11 a motor 13 and a pump 15. The cylinder actuator 11 includes a piston 6 and a rod 14 defining a piston side 16 and a rod side 18 of the cylinder 11, respectively.

Additional valving is shown for various uses including to compensate for the issue of differential areas between the rod and piston sides of the cylinder. Because the cylinder rod 14 is present on one side of the cylinder 11 and not the other, there is a difference in hydraulic volume between the piston side 16 and rod side 18. Therefore as the cylinder 11 extends, the volume of fluid returning from the rod side 18 is insufficient and additional oil must be drawn from tank via a first check valve 20. As the cylinder retracts, excessive fluid returns to the pump and thus needs to be dumped to a reservoir 24.

In extend mode, high pressure from the pump 15 flows to and opens check valve 30. Further, this high pressure opens check valve 10 to allow low pressure flow from the rod side 18 of the actuator 11 to flow to the pump 15. Excess flow is drawn to the pump from tank through check valve 20. Relief valve 12 will open to relieve pressure if the high pressure fluid reaches a pressure-relief setting.

In retract mode, high pressure from the pump 15 flows to and opens check valve 10. Further, this high pressure opens check valve 30 to allow low pressure flow from the piston side 16 of the actuator 11 to flow to the pump 15. Excess flow is dumped to tank via relief valve 12 which is actuated by fluid from the high-pressure side of the pump 15 via spool 22. This allows the excess fluid to be dumped to tank at relatively low pressure. The spool 22 may be configured to provide a strong mechanical advantage by, for example, having a large surface area acted upon by the high-pressure flow, compared to the surface area of the relief valve 12.

Figure 2:
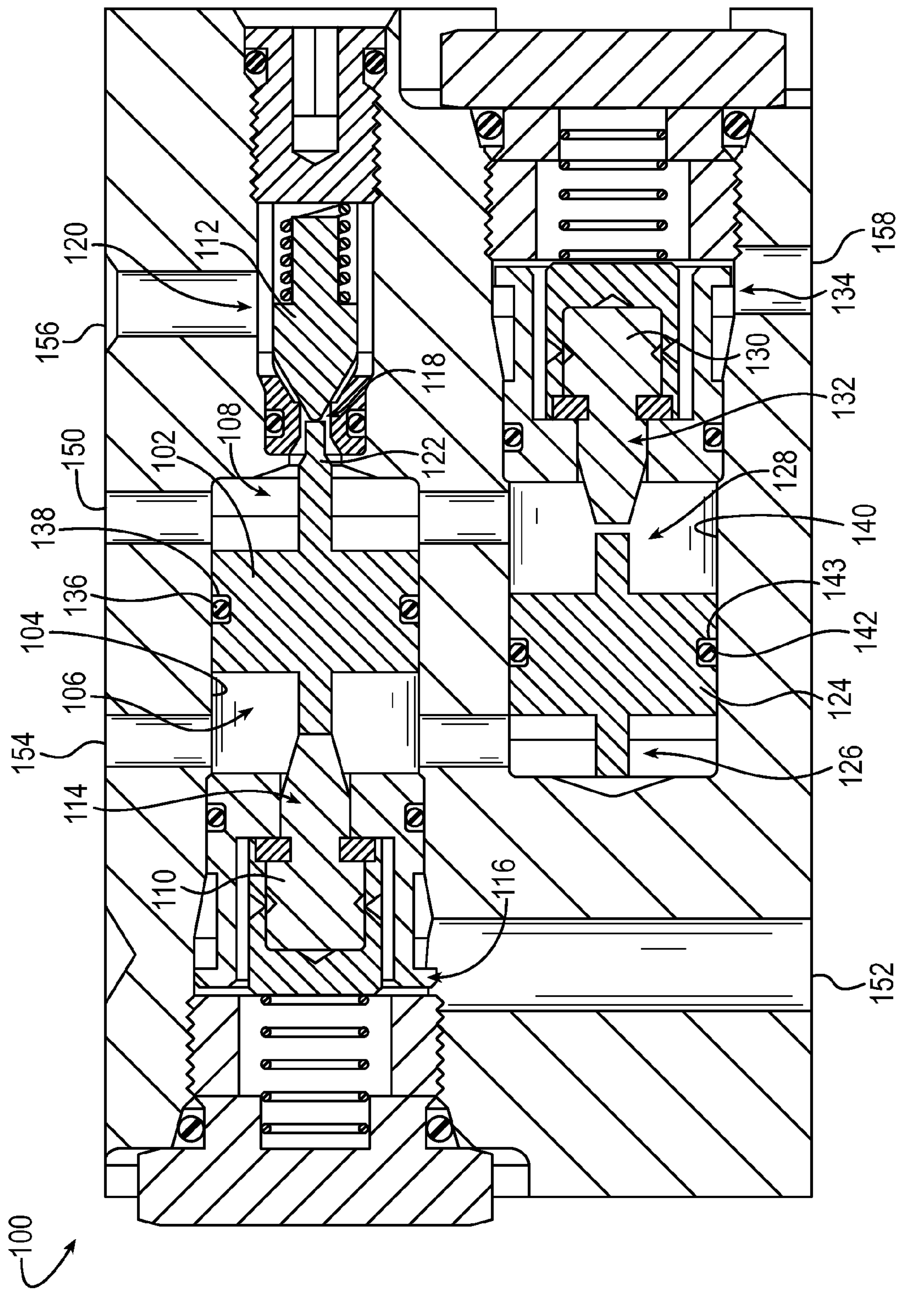
FIG. 2 shows a cross-sectional view of an exemplary valve assembly using an extend relief valve as a pilot-operated dump valve in a neutral position.

Referring now to FIG. 2, shown is a valve assembly 100 for releasing excess fluid to a reservoir 24 at low pressure in accordance with aspects of the present invention. The valve assembly 100 includes a first spool 102 moveable in a first bore 104 between first, second, and third positions. The first bore 104 has a first side 106 and a second side 108.

Figure 3:
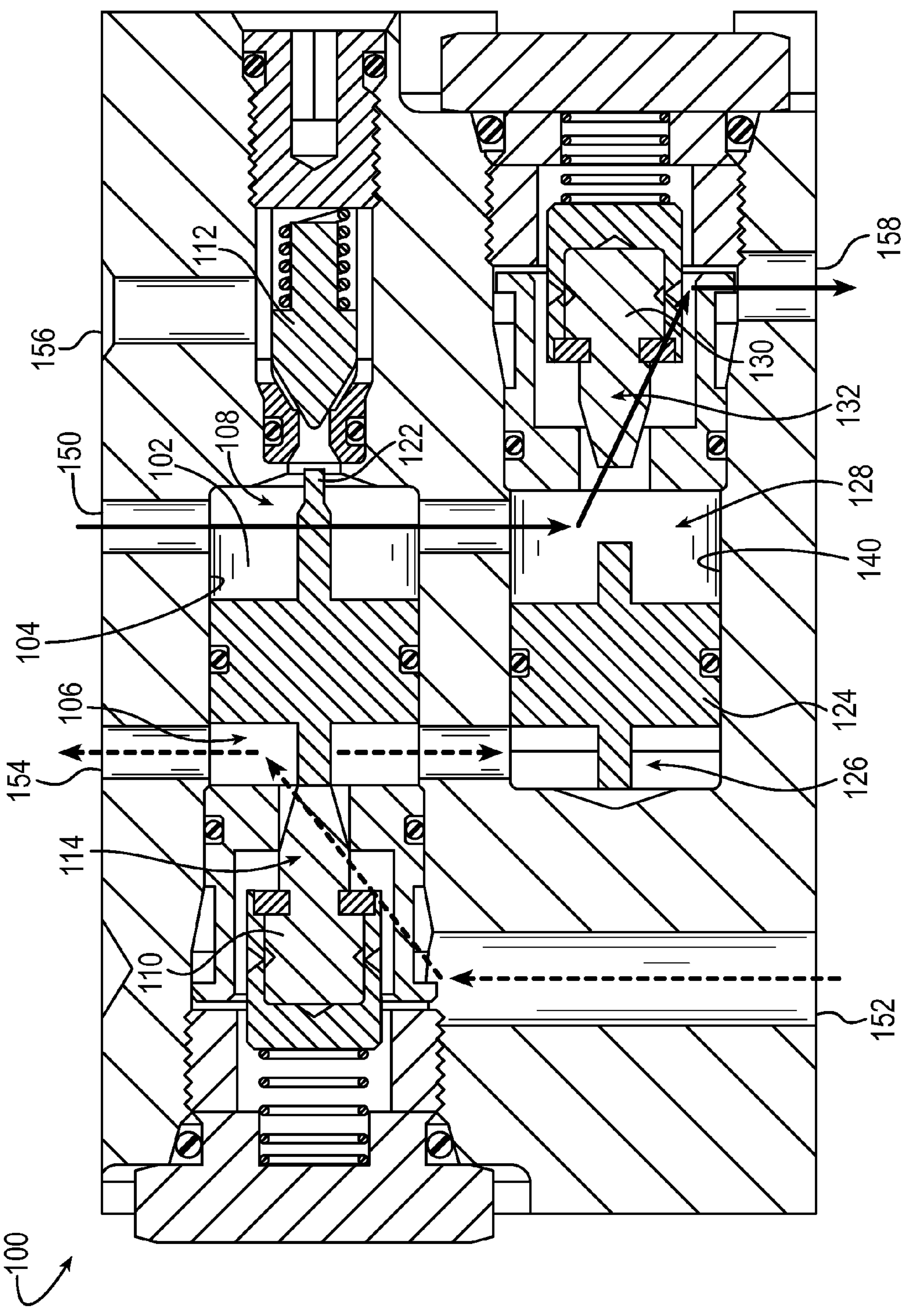
FIG. 3 shows a cross-sectional view of an exemplary valve assembly using an extend relief valve as a pilot-operated dump valve in a cylinder-extend position.

The first spool 102 is configured to open a first check valve 110 when the first spool 102 is energized by relatively high pressure fluid on the second side 108, causing the first spool to move to the first position (as shown in FIG. 3). This relatively high pressure may be supplied by the pump 15 through pump port 150. The opening of the first check valve 110 allows, for example, rod side fluid from the cylinder through rod-side port 152 to return to the pump via pump port 154. Because the first spool 102 is shifted away from the extend relief valve 112, full high relief valve pressure is required at that location to open the extend relief valve 112 in order to dump fluid to tank via tank port 156.

Figure 4:
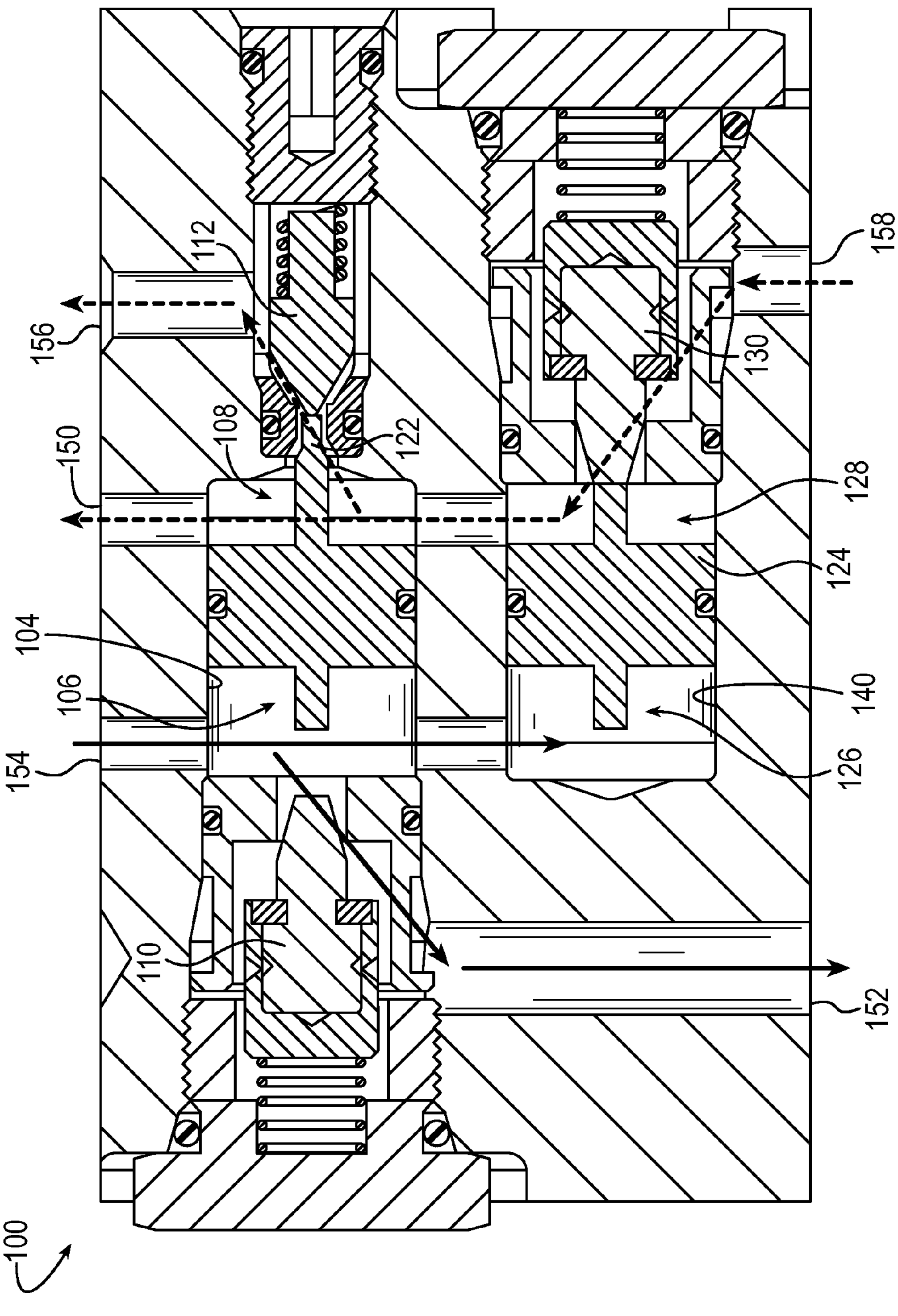
FIG. 4 shows a cross-sectional view of an exemplary valve assembly using an extend relief valve as a pilot-operated dump valve in a cylinder retract position.

The first spool 102 is further configured to open an extend relief valve 112 when the first spool 102 is energized by relatively high pressure fluid on the first side, causing the spool 102 to move to the third position (as shown in FIG. 4), thereby allowing relatively low pressure excess fluid to flow through the extend relief valve 112 from, for example, the piston-side port 158 to the tank via tank port 156. This relatively high pressure may be supplied by the pump 15 through pump port 154, may open the check valve 110, and may flow out rod-side port to flow to the actuator. By utilizing the larger surface area of the first spool facing the first side 106 of the bore 104 to shift open the extend relief valve 112, the excess fluid is allowed to return to tank at low pressure.

The first check valve 110 has a flow side 114 and a block side 116 and may be configured to open when relatively high pressure fluid impinges on the flow side, in addition to being openable by the first spool as discussed above.

The extend relief valve 112 may have a flow side 118 and a block side 120 and may be configured to remain closed when relatively high pressure fluid impinges on the flow side. Only when pressure reaches a higher pressure-relief setting would the extend relief valve 112 open without assistance from the first spool 102.

The first spool 102 may have a protrusion 122 facing the second side 108 for contacting the extend relief valve 112 and a surface area open to the first side 106 substantially greater than the surface area of the protrusion, thereby granting a mechanical advantage to the system for allowing the relatively high pressure fluid on the first side 106 to actuate the extend relief valve 112 through the first spool 102.

The first side 106 of the bore 104 may be in fluid communication with a flow side 114 of the first check valve 110.

The second side 108 of the first bore 104 may be in fluid communication with the flow side 118 of the extend relief valve 112.

The valve assembly 100 may further include a second spool 124 having a first side 126 and a second side 128. The second spool may be configured to open a second check valve 130 when the second spool is energized by relatively high pressure fluid on the first side 126 of the second spool 124.

The second check valve 130 may have a flow side 132 and a block side 134 and may be configured to open when relatively high pressure fluid impinges on the flow side 132 of the second check valve 130.

The first side 106 of the first bore 104 may be in fluid communication with the first side 126 of the second bore 140, and the second side 108 of the first bore 104 may be in fluid communication with the second side 128 of the second bore 140.

The second side 128 of the second bore 140 may be in fluid communication with a flow side 132 of the second check valve 130.

The first side 106 of the first bore 104 may be sealed away from the second side 108 of the first bore 104 by an O-ring seal 136 located in an annular groove 138 of the first spool 102.

The first side 126 of the second bore 140 may be sealed away from the second side 128 of the second bore 140 by an O-ring seal 142 located in an annular groove 143 of the second spool 124.

As illustrated in FIG. 3, when operating in a cylinder-extend mode, pressurized fluid from the pump 15 enters both spool bores 104, 140 and shifts the second check valve 130 open to allow fluid out to the cylinder 11. At the same time, pressurized fluid in the upper spool bore 104 shifts the first spool 102 to the left opening the first check valve 110 and allows rod side 18 fluid from the cylinder 11 to return to the pump 15. Because the first spool 102 is shifted away from the extend relief valve 112, full high relief valve pressure is required to open extend relief valve 112 and dump fluid to the reservoir 24.

As illustrated in FIG. 4, when operating in a cylinder retract mode, pressurized fluid from the pump 15 enters upper spool bore 104 and shifts the first check valve 110 open to allow fluid out to the cylinder 11. At the same time, pressurized fluid in the lower spool bore 140 shifts the second spool 124 to the right opening the second check valve 130 and allows piston side 16 fluid from the cylinder 11 to return to the pump 15. By utilizing the larger surface area of the first spool 102 to shift open the extend relief valve 112, the excess fluid is allowed to return to the reservoir 24 at low pressure. As each spool 102, 124 contains an O-ring seal 136, 142, there is no concern of internal leakage across spools, thus increasing performance and reducing cost by reducing the precision machining required in previous designs.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A valve assembly for releasing excess fluid to a reservoir at low pressure comprising:

a first spool moveable in a first bore in a valve body having a first side and a second side;

a first check valve disposed in the first side of the first bore;

an extend relief valve disposed in the second side of the first bore;

a second spool moveable in a second bore in the valve body having a first side and a second side; and a second check valve disposed in the second side of the second bore, wherein the first spool is configured to press against and thereby open the first check valve when the first spool is energized by relatively high pressure fluid in the second side of the bore, and is further configured to press against and thereby open the extend relief valve when the first spool is energized by relatively high pressure fluid on the first side, thereby allowing relatively low pressure fluid to flow through the extend relief valve, and wherein the second spool is configured to press against and thereby open the second check valve when the second spool is energized by relatively high pressure fluid in the first side of the second spool.

2. The valve assembly of claim 1 wherein the first check valve has a flow side and a block side and is configured to open when relatively high pressure fluid impinges on the flow side.

3. The valve assembly of claim 1 wherein the extend relief valve has a flow side and a block side and is configured to remain closed when relatively high pressure fluid impinges on the flow side.

4. The valve assembly of claim 1 wherein the first spool has a protrusion facing the second side for contacting the extend relief valve and a surface area facing the first side substantially greater than the surface area of the protrusion, thereby granting a mechanical advantage to the system for allowing the relatively high pressure fluid on the first side to actuate the extend relief valve through the first spool.

5. The valve assembly of claim 1 wherein the first side of the first spool is in fluid communication with a flow side of the first check valve.

6. The valve assembly of claim 1 wherein the second side of the first spool is in fluid communication with the flow side of the extend relief valve.

7. The valve assembly of claim 1 wherein the second check valve has a flow side and a block side and is configured to open when relatively high pressure fluid impinges on the flow side of the second check valve.

8. The valve assembly of claim 1 wherein the first side of the first spool is in fluid communication with the first side of the second spool, and the second side of the first spool is in fluid communication with the second side of the second spool.

9. The valve assembly of claim 1 wherein the second side of the second spool is in fluid communication with a flow side of the second check valve.

10. The valve assembly of claim 1 wherein the first side of the first spool is sealed away from the second side of the first spool by an O-ring seal located in an annular groove of the first spool.

11. A valve assembly for releasing excess fluid to a reservoir at low pressure comprising:

a first spool moveable between first, second, and third positions in a first bore in a valve body, the first bore having a first side and a second side;

a first check valve disposed in the first side of the first bore;

an extend relief valve disposed in the second side of the first bore;

a second spool moveable between first, second, and third positions in a second bore in the valve body, the second bore having a first side and a second side; and a second check valve disposed in the second side of the second bore, wherein the first spool presses against and thereby opens the first check valve when the first spool is in the first position, and presses against and thereby opens the extend relief valve when the first spool is in the third position, thereby allowing relatively low pressure fluid to flow through the extend relief valve, and wherein the second spool presses against and thereby opens the second check valve when the second spool is in the third position.

12. The valve assembly of claim 11 wherein the first check valve has a flow side and a block side and is configured to open when relatively high pressure fluid impinges on the flow side.

13. The valve assembly of claim 11 wherein the extend relief valve has a flow side and a block side and is configured to remain closed when relatively high pressure fluid impinges on the flow side.

14. The valve assembly of claim 11 wherein the first spool has a protrusion facing the second side for contacting the extend relief valve and a surface area facing the first side substantially greater than the surface area of the protrusion, thereby granting a mechanical advantage to the system for allowing the relatively high pressure fluid on the first side to actuate the extend relief valve through the first spool.

15. The valve assembly of claim 11 wherein the first side of the first spool is in fluid communication with a flow side of the first check valve.

16. The valve assembly of claim 11 wherein the second side of the first spool is in fluid communication with the flow side of the extend relief valve.

17. The valve assembly of claim 11 wherein the second check valve has a flow side and a block side and is configured to open when relatively high pressure fluid impinges on the flow side of the second check valve.

18. The valve assembly of claim 1 wherein the second side of the second spool is in fluid communication with a flow side of the second check valve.

* * * * *